(12) United States Patent
Sugihara

(10) Patent No.: US 10,497,926 B2
(45) Date of Patent: Dec. 3, 2019

(54) KNEADER AND MANUFACTURING METHOD OF ELECTRODE BODY INCLUDING ELECTRODE ACTIVE MATERIAL USING THE SAME

(71) Applicant: TOYOTA JIDOSHA KABUSHIKI KAISHA, Toyota-shi, Aichi-ken (JP)

(72) Inventor: Atsushi Sugihara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 365 days.

(21) Appl. No.: 15/244,555

(22) Filed: Aug. 23, 2016

(65) Prior Publication Data

US 2017/0062797 A1 Mar. 2, 2017

(30) Foreign Application Priority Data

Aug. 28, 2015 (JP) .................. 2015-168494

(51) Int. Cl.
*H01M 4/04* (2006.01)
*H01M 4/1393* (2010.01)
(Continued)

(52) U.S. Cl.
CPC ............. *H01M 4/0404* (2013.01); *B01F 7/04* (2013.01); *B01F 7/08* (2013.01); *B29C 48/57* (2019.02);
(Continued)

(58) Field of Classification Search
CPC ......... B05C 5/0254; B05C 5/00; B05C 21/00; B23K 35/404; B28B 3/22; B29C 47/6056;
(Continued)

(56) References Cited

U.S. PATENT DOCUMENTS

| 6,071,643 A * | 6/2000 | Chino ................. H01M 2/0257 |
| | | 429/176 |
| 8,158,179 B2 * | 4/2012 | Bouvier ............... A21C 11/163 |
| | | 425/114 |
| 2015/0182926 A1 * | 7/2015 | Yamada ................. B29B 7/482 |
| | | 366/86 |

FOREIGN PATENT DOCUMENTS

| JP | 56-21634 A | 2/1981 |
| JP | 63-202408 A | 8/1988 |

(Continued)

OTHER PUBLICATIONS

Partial Translation of Communication dated Jul. 10, 2018, from the State Intellectual Property Office of People's Republic of China in counterpart Application No. 201610738977.2.

*Primary Examiner* — Laura Edwards
(74) *Attorney, Agent, or Firm* — Sughrue Mion, PLLC

(57) ABSTRACT

A kneader has a rotational conveyance member configured to knead the kneading material and convey the kneading material from an inlet toward an outlet by a rotational motion around an axis. The rotational conveyance member has a kneading zone configured to knead the kneading material, a first conveyance zone placed on an upstream side relative to the kneading zone and configured to convey the kneading material, and a second conveyance zone placed on a downstream side relative to the kneading zone and configured to convey the kneading material, and a conveyance force of the second conveyance zone is smaller than a conveyance force of the first conveyance zone in a case where the same conveyance object is conveyed.

8 Claims, 7 Drawing Sheets

(51) Int. Cl.
*B29C 48/57* (2019.01)
*B01F 7/08* (2006.01)
*B01F 7/04* (2006.01)
*H01M 4/133* (2010.01)
*H01M 4/587* (2010.01)
*H01M 4/62* (2006.01)

(52) U.S. Cl.
CPC ........... *H01M 4/04* (2013.01); *H01M 4/0411* (2013.01); *H01M 4/1393* (2013.01); *H01M 4/133* (2013.01); *H01M 4/587* (2013.01); *H01M 4/622* (2013.01)

(58) Field of Classification Search
CPC ....... B29C 48/64; B29C 48/66; B29C 48/682; B29C 48/57; B29B 7/482; B29B 7/48; B29B 7/74; B29B 47/6012; B29B 47/6056; B29B 7/489; B29B 48/57; F04C 2/16; H01M 4/0404; H01M 4/0411; H01M 4/1393; H01M 10/052; H01M 4/622; H01M 4/133; H01M 4/587; H01M 4/139; H01M 4/04; B01F 2015/0204; B01F 15/0201; B01F 7/08; B41F 7/04; Y02P 70/54
USPC ............................. 366/81, 89; 425/204, 206
See application file for complete search history.

(56) References Cited

FOREIGN PATENT DOCUMENTS

| | | |
|---|---|---|
| JP | 09-142635 A | 6/1997 |
| JP | 09-180709 A | 7/1997 |
| JP | 10-109309 A | 4/1998 |
| JP | 11-300737 A | 11/1999 |
| JP | 2001-9830 A | 1/2001 |
| JP | 2005-222772 A | 8/2005 |
| JP | 2014-207180 A | 10/2014 |
| JP | 2014-223791 A | 12/2014 |
| WO | 2014/016921 A1 | 1/2014 |
| WO | WO-2014/030598 * | 2/2014 |

* cited by examiner

KNEADER AND MANUFACTURING METHOD OF ELECTRODE BODY INCLUDING ELECTRODE ACTIVE MATERIAL USING THE SAME

INCORPORATION BY REFERENCE

The disclosure of Japanese Patent Application No. 2015-168494 filed on Aug. 28, 2015 including the specification, drawings and abstract is incorporated herein by reference in its entirety.

BACKGROUND OF THE INVENTION

1. Field of the Invention

The present invention relates to a kneader for kneading a kneading material so as to obtain a pasty kneaded mixture, and a manufacturing method for manufacturing an electrode body including an electrode active material by manufacturing an electrode active material paste by use of the kneader. More specifically, the present invention relates to a kneader that reduces unevenness in viscosity of an obtained kneaded mixture, and a manufacturing method for manufacturing an electrode body including an electrode active material by using an electrode active material paste obtained by use of the kneader and having less unevenness in viscosity.

2. Description of Related Art

Conventionally, an electrode active material paste obtained in a paste form by dispersing an electrode active material in a dispersion medium is used for manufacture of an electrode body. That is, the electrode body is obtained such that an electrode active material layer is formed on a collector by applying the electrode active material paste on the collector. Here, a kneader is, of course, used for manufacture of the electrode active material paste. An example of the kneader is described in FIG. 1 of Japanese Patent Application Publication No. 9-180709 (JP 9-180709 A). The kneader in the figure is configured to stir and knead a "mixture 4" (that is, a raw material) put into a "hopper 5" while conveying the mixture with an "extruder screw 2." By use of a mixture including an electrode active material as the raw material, an electrode active material paste is obtained from a "through-hole 7" provided in a left end part in the figure.

SUMMARY OF THE INVENTION

However, the above technique described above has the following problem. A viscosity of the electrode active material paste to be obtained is not necessarily uniform. That is, even if the kneader is driven under a given condition, the viscosity of the electrode active material paste to be obtained might increase temporarily. Because of this, in a case where the electrode active material paste to be obtained is used for application as it is, poor application may be caused due to an unexpected abnormal viscosity. This affects the manufacture of the electrode body. Particularly, when a solid content ratio in a raw material for kneading to obtain an electrode active material paste is set rather high, such a problem tends to easily occur. When the kneader is driven in a high-speed rotation state such as a double speed, a similar problem also tends to easily occur.

The present invention provides a kneader that provides a kneaded mixture with less unevenness in viscosity, and a method for stably manufacturing an electrode body including an electrode active material by use of an electrode active material paste with less unevenness in viscosity.

A first aspect of the present invention relates to a kneader having an inlet into which a kneading material is input, an outlet from which a kneaded mixture obtained by kneading the kneading material is discharged, and a rotational conveyance member configured to knead the kneading material and convey the kneading material from the inlet toward the outlet by a rotational motion around an axis. The rotational conveyance member has a kneading zone configured to knead the kneading material, a first conveyance zone placed on an upstream side relative to the kneading zone and configured to convey the kneading material, and a second conveyance zone placed on a downstream side relative to the kneading zone and configured to convey the kneading material. A conveyance force of the second conveyance zone is smaller than a conveyance force of the first conveyance zone in a case where the same conveyance object is conveyed.

In the kneader according to the above aspect, when the kneading material is put into the inlet, the kneading material is conveyed toward the outlet by the rotational motion of the rotational conveyance member around the axis. Since the kneading material is kneaded in such a convey step, the kneading material is discharged from the outlet as a kneaded mixture (paste). Here, in the kneading zone between the first conveyance zone on the upstream side and the second conveyance zone on the downstream side in the rotational conveyance member, the kneading is performed in such a state where inflow of the kneading material from the first conveyance zone is predominant over outflow of the kneaded mixture to the second conveyance zone. This is because the conveyance force of the second conveyance zone is smaller than the conveyance force of the first conveyance zone. Accordingly, a negative pressure state caused due to a decrease in the kneaded mixture in the kneading zone rarely occurs. Hereby, stable kneading is performed with less fluctuation over time such as a temporary increase in viscosity of the kneaded mixture.

In the above kneader, the rotational conveyance member may include a first screw blade in the first conveyance zone, the rotational conveyance member may include a second screw blade in the second conveyance zone, and a ratio of an outside diameter of the screw blade in the first conveyance zone to an outside diameter of the screw blade in the second conveyance zone may be 1.2 or more. In a case where the other conditions are the same, the conveyance force is stronger as the outside diameter of the screw blade is larger. Even in a case where a manufacturing condition of the kneaded mixture is severe to some extent, if there is a difference in outside diameter to the above extent between the first conveyance zone and the second conveyance zone, a significant effect can be obtained. The outside diameter ratio may be 1.4 or more, or may be 1.6 or more. When their conveyance forces are focused, the conveyance force of the latter (one on the downstream side) may be smaller at a ratio of 0.84 or less. The ratio of the conveyance force of the first conveyance zone to the conveyance force of the second conveyance zone may be 0.72 or less, or may be 0.58 or less. Note that, in a case where the manufacturing condition of the kneaded mixture is not so severe, even if the difference in conveyance between the first conveyance zone and the second conveyance zone does not satisfy the above condition, the effect can be obtained to some extent.

Further, the second aspect of the present invention relates to a manufacturing method of an electrode body including an electrode active material. The manufacturing method includes: kneading a kneading material including an electrode active material by a kneader, so as to obtain an electrode active material paste; and applying, to a collector, the obtained electrode active material paste, so as to obtain an electrode body in which an electrode active material layer is formed on the collector. The kneader of the first aspect is used as the kneader such that the kneading material including the electrode active material is put into the inlet, and the electrode active material paste is obtained from the outlet.

In the manufacturing method of the electrode body in the present aspect, the kneading material including the electrode active material is kneaded by the kneader of the above aspect, so as to obtain the electrode active material paste. Since the kneader of the above aspect is used, a viscosity and the like of the electrode active material paste to be obtained are stable. Accordingly, by obtaining the electrode body by use of the electrode active material paste, it is possible to manufacture the electrode body with a high quality.

Here, a solid content ratio in the kneading material to be put into the inlet of the kneader may be 60% by weight or more. When the solid content ratio in the kneading material is high, unevenness in viscosity and the like easily occur at the time of manufacturing the electrode active material paste, and it may be said that the high solid content ratio is severe as the manufacture condition. Even in such a case, by applying the present invention, it is possible to manufacture a stable electrode active material paste and to manufacture a high-quality electrode body by use of the electrode active material paste.

According to the configuration, it is possible to provide a kneader that provides a kneaded mixture with less unevenness in viscosity and a method for stably manufacturing an electrode body including an electrode active material by use of an electrode active material paste with less variation in viscosity.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment for embodying the present invention in detail with reference to the attached drawings. In the present embodiment, the present invention is applied to manufacture of an electrode body according to a process procedure (see FIG. 1) including the following kneading step and active material layer formation step.

1. Manufacture of Electrode Active Material Paste (Kneading Step)
2. Formation of Electrode Active Material Layer on Collector By Manufactured Electrode Active Material Paste (Active Material Layer Formation Step)

Figure 1:
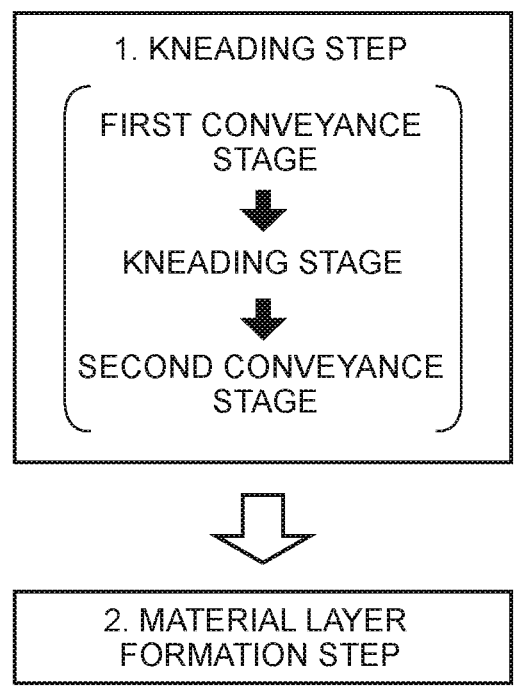
FIG. 1 is a flowchart illustrating a manufacturing procedure of an electrode body in an embodiment.
Figure 2:
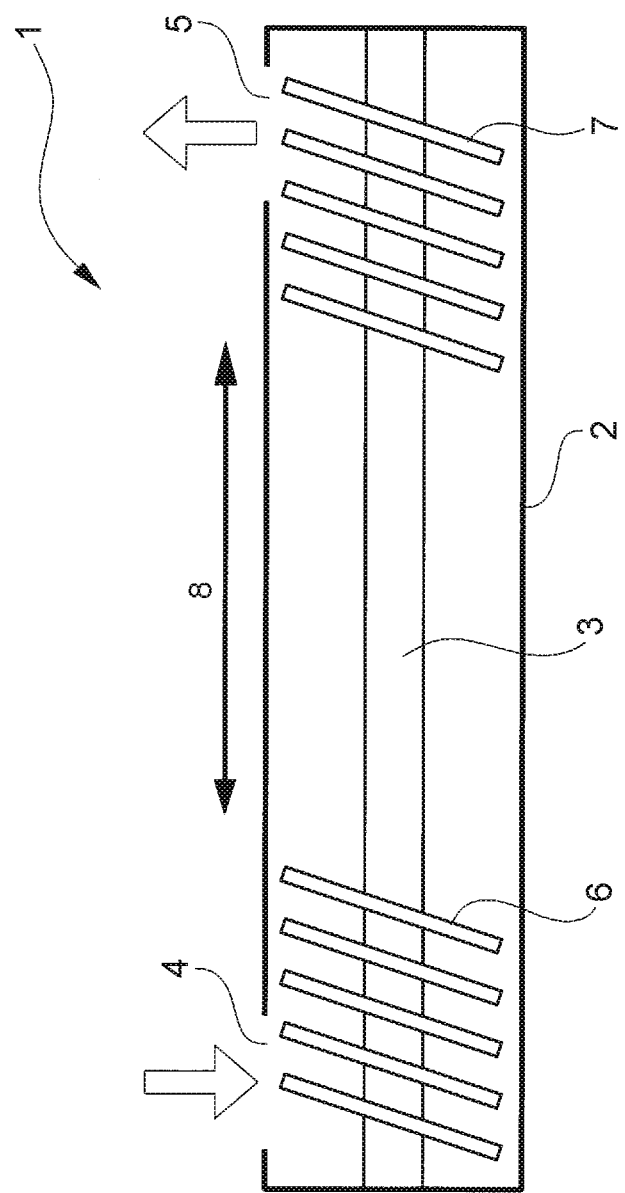
FIG. 2 is a sectional view diagrammatically illustrating a kneader according to the embodiment.

The kneading step includes a first conveyance stage, a kneading stage, and a second conveyance stage as illustrated in FIG. 1. The kneading step is performed by use of a kneader 1 illustrated in FIG. 2. The kneader 1 in FIG. 2 is described. Briefly speaking, the kneader 1 includes a conveyance screw 3 inside a housing 2. The housing 2 has an inlet 4 near one end of the housing 2, and an outlet 5 near the other end thereof. Further, the conveyance screw 3 has conveyance zones 6, 7 near the inlet 4 and the outlet 5, respectively. In each of the conveyance zones 6, 7, a screw blade is provided. A conveyance zone closer to the inlet 4 is referred to as the first conveyance zone 6, and a conveyance zone closer to the outlet 5 is referred as the second conveyance zone 7. Further, a zone between the first conveyance zone 6 and the second conveyance zone 7 is referred to as a kneading zone 8.

Hereby, the kneader 1 is configured to knead and convey a kneading material put into the inlet 4 toward a right side in FIG. 2 (from the inlet 4 toward the outlet 5) inside the housing 2 by a rotation of the conveyance screw 3 around its axis. The kneading material is kneaded into a paste form along with the conveyance in the kneading zone 8, and discharged from the outlet 5.

Figure 3:
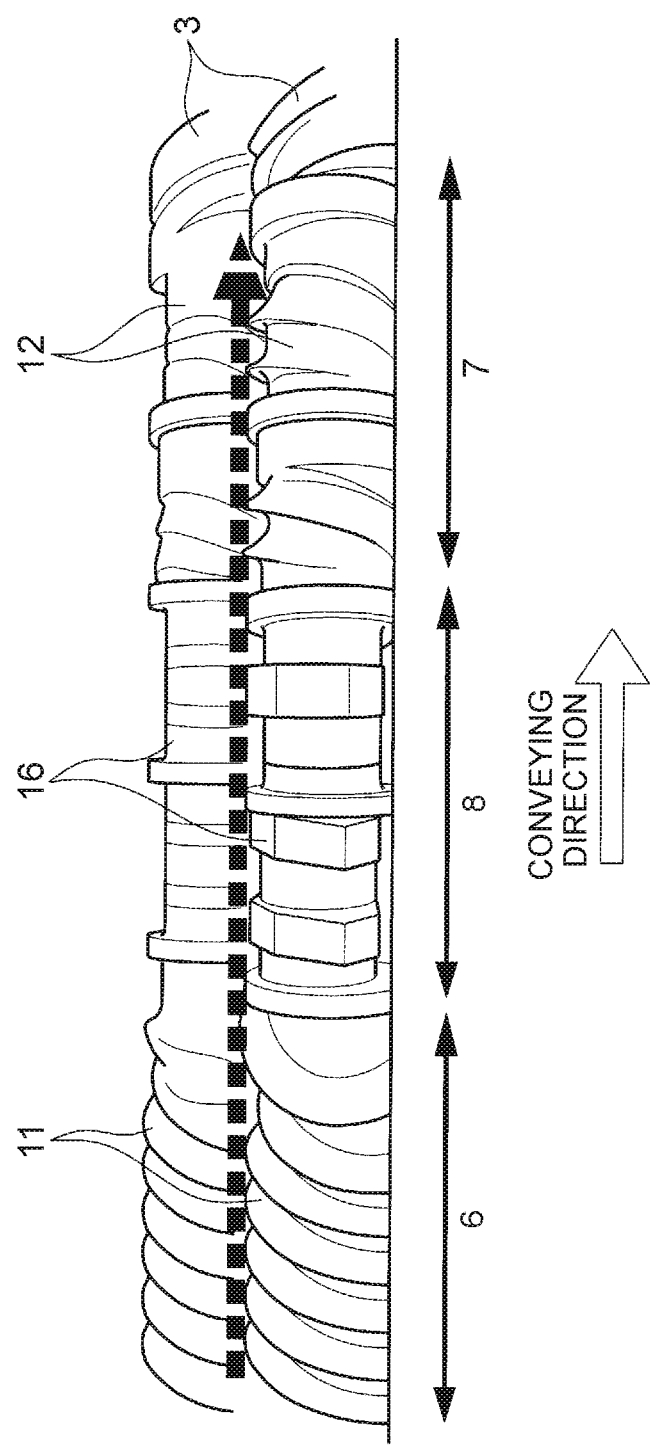
FIG. 3 is a perspective view illustrating a conveyance screw of the kneader according to the embodiment.

The kneader 1 is further described. Two conveyance screws 3 are actually placed in parallel to each other inside the housing 2 as illustrated in FIG. 3. A first screw blade 11 and a second screw blade 12 are provided in the conveyance screw 3 in a range of the first conveyance zone 6 and in a range of the second conveyance zone 7, respectively. Hereby, in the kneader 1, when the two conveyance screws 3 are rotated, a conveyance force in a conveying direction in the figure is generated with respect to the kneading material.

Figure 4:
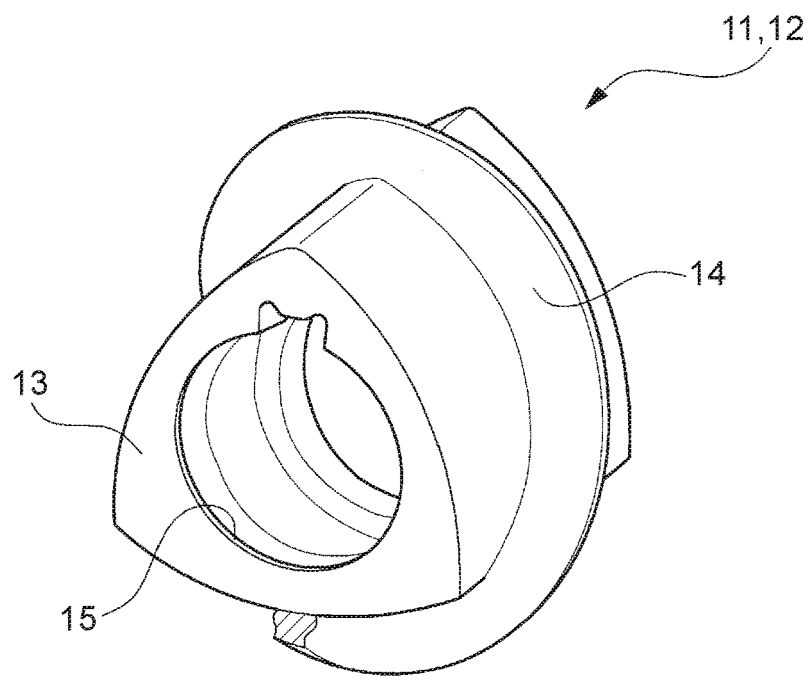
FIG. 4 is a perspective view illustrating a screw blade provided in the conveyance screw of the kneader according to the embodiment.

The first screw blade 11 and the second screw blade 12 are described with reference to a perspective view of FIG. 4. The first screw blade 11 and the second screw blade 12 both have a shape as illustrated in FIG. 4. That is, the screw blade includes a rotor portion 13, and a thread portion 14 provided on an outer peripheral surface of the rotor portion 13. As a whole, the rotor portion 13 has a triangular prism shape in which a side face slightly swells like a triangle called "Reuleaux triangle." The side face thus swelling is the outer peripheral surface of the rotor portion 13. The thread portion 14 is a general spiral projection. Further, an attachment hole 15 to be attached to a shaft is formed in a center of the rotor portion 13.

The first screw blade 11 and the second screw blade 12 both have the above shape, but have different sizes. The size as used herein indicates an outside diameter A of the thread portion 14 or a diameter B of the rotor portion 13, as illustrated in a front view of FIG. 5. A concrete example of the difference in size between the first screw blade 11 and the second screw blade 12 will be described later. Note that a part corresponding to the kneading zone 8 in the conveyance screw 3 is also provided with a stirring member 16 having an outer shape liked the rotor portion 13. However, the stirring member 16 is not provided with the thread portion 14.

Figure 6:
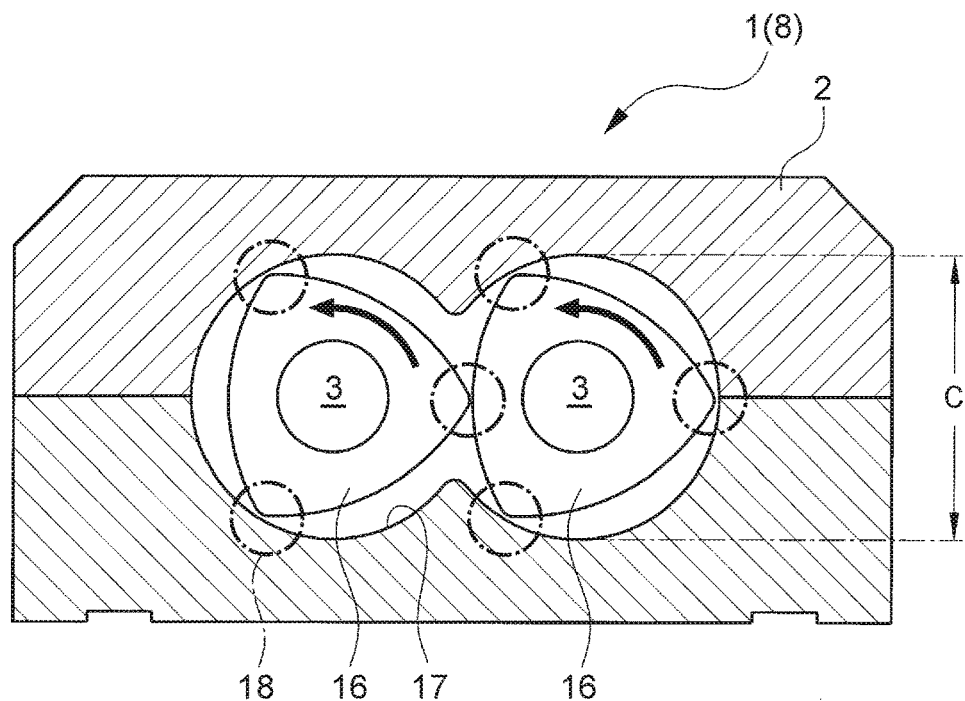
FIG. 6 is a sectional view of the kneader according to the embodiment.

The two conveyance screws 3 of FIG. 3 are configured as described above, and are configured to rotate together at the same rotation speed in the same rotation direction at the time of kneading. Hereby, in the first conveyance zone 6 and in the second conveyance zone 7, a conveyance force is generated rightward in FIG. 3 with respect to the kneading material. When the two conveyance screws 3 are rotated in this manner, the kneading material is kneaded in the part corresponding to the kneading zone 8. That is, in this zone, as illustrated in FIG. 6, there are five places where apexes of the stirring members 16 come closer to an inner surface 17 of the housing 2. Further, there is one place where one apex of one stirring member 16 comes closer to a part of the other stirring member 16 other than the apexes thereof. These six places are referred to as processing points 18. Note that an inside diameter C of the inner surface 17 in the kneading zone 8 is set so that a slight gap is formed between the apex of the stirring member 16 and the inner surface 17.

Figure 7:
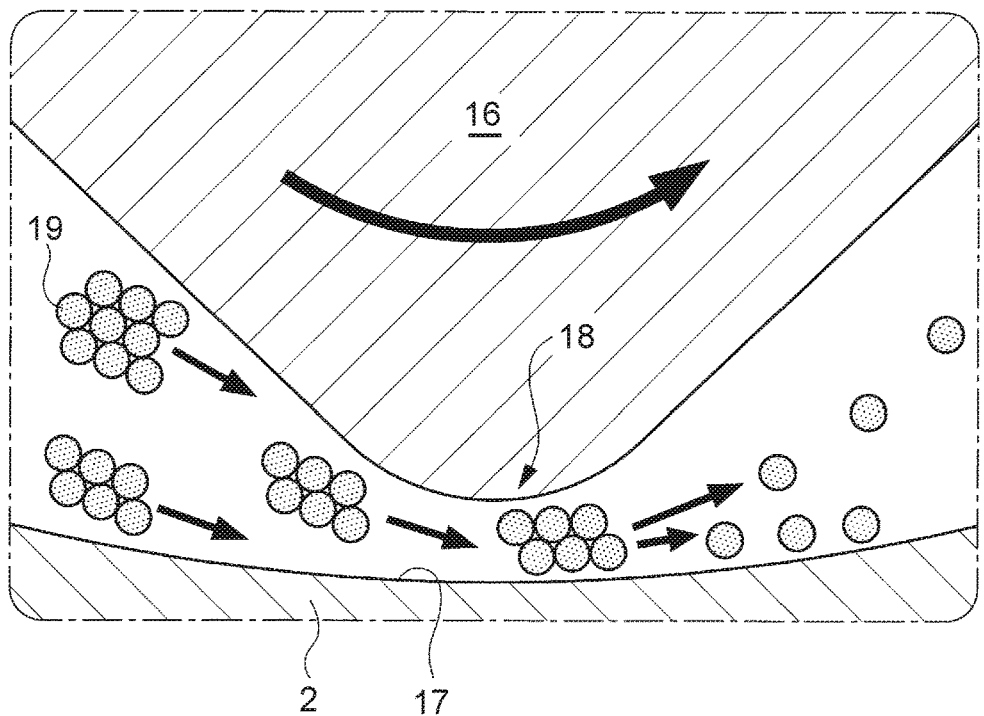
FIG. 7 is a schematic view illustrating a state at a processing point in the kneader.

The two conveyance screws 3 rotate in the same direction in FIG. 6, and along with this, and the six processing points 18 move. As illustrated in FIG. 7, at the processing point 18, the kneading material 19 is untied and stirred due to a speed difference between the inner surface 17 that stands still and the apex of the stirring member 16 that moves. Note that FIG. 7 illustrates the processing point 18 between the stirring member 16 and the inner surface 17 of the housing 2. However, this also applies to the processing point between the stirring members 16. This is because, at this processing point, the stirring members 16 move in opposite directions and have a difference in speed.

Here, in the kneader 1 configured as described above, a conveyance force of the first conveyance zone 6 on an upstream side is stronger than that of the second conveyance zone 7 on a downstream side, in a case where the same conveyance object is conveyed. More specifically, the difference between their conveyance forces is attained by the size difference between the first screw blade 11 and the second screw blade 12.

Figure 5:
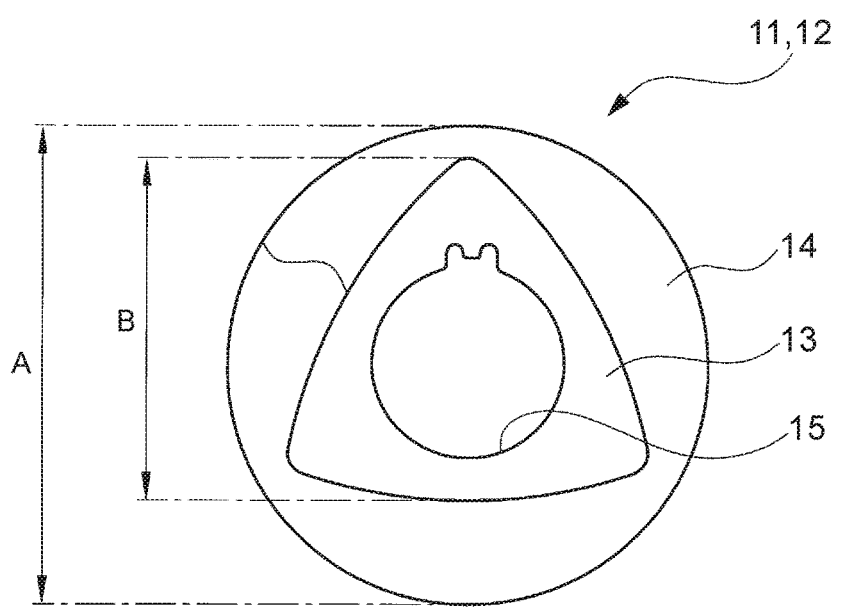
FIG. 5 is a front view of the screw blade shown in FIG. 4.

For example, the conveyance force is stronger as the outside diameter A of the thread portion 14 illustrated in FIG. 5 is larger. Meanwhile, in a case where the outside diameter A is the same, as the diameter B of the rotor portion 13 is smaller, the conveyance force is stronger. In view of this, for example, the first screw blade 11 and the second screw blade 12 are set to have the same diameter B of the rotor portion 13 and have a difference in the outside diameter A such that the outside diameter A of the first screw blade 11 is made larger than the outside diameter A of the second screw blade 12. Alternatively, the outside diameters A may be set to the same, while the diameters B of the rotor portions 13 are made different. In that case, the diameter B of the first screw blade 11 is, of course, made smaller than the diameter B of the second screw blade 12. Of course, their outside diameters A may be also made different and their diameters B may be also made different.

A measure to make a difference in conveyance force between the first conveyance zone 6 and the second conveyance zone 7 is not limited to the outside diameter A and the diameter B. For example, the following measures are conceivable: the number of threads of the thread portion 14 (the conveyance force is stronger as the number of threads is larger); and a size of a notch in a case where the notch is provided in the thread portion 14 (the conveyance force is stronger as the notch is smaller). Further, the difference in conveyance force can be achieved by making a difference in rotation speed of the conveyance screws 3 between the first conveyance zone 6 and the second conveyance zone 7 (the conveyance force is stronger as the rotation speed is faster). Two or more of them may be used in combination.

With the use of the kneader 1 configured as described above, an electrode active material paste to be used for an electrode body of a battery can be manufactured. The following description is made by taking, as an example, a case of manufacturing a negative-electrode active material paste to be used for a negative electrode of a lithium-ion secondary battery. A kneading material to be used herein includes the followings.

Active Material: Graphite
Thickener: CMC (carboxymethyl cellulose)
Binder: SBR (styrene-butadiene rubber)
Kneading Solvent: Water (ion-exchange water)

The kneading material is put into the inlet 4 of the kneader 1 as has been described above. The kneading material thus put therein is conveyed from the left side toward the right side in FIG. 3 in the kneader 1 by rotations of the conveyance screws 3. That is, conveyance forces toward the right side in FIG. 3 are generated in the first conveyance zone 6 and the second conveyance zone 7 by the rotations of the conveyance screws 3. The kneading material put into the inlet 4 is conveyed to the kneading zone 8 by the conveyance force of the first conveyance zone 6 (the first screw blade 11) (the first conveyance stage). Further, the kneading material is kneaded by rotations of the stirring members 16 in the kneading zone 8, so that a negative-electrode active material paste is obtained (the kneading stage). Then, the kneading material as the negative-electrode active material paste in the kneading zone 8 is extruded toward the outlet 5 by the conveyance force of the second conveyance zone 7 (the second screw blade 12) (the second conveyance stage). Hereby, the negative-electrode active material paste is discharged from the outlet 5.

The operation of the kneader 1 has the following effects due to the difference in conveyance force between the first conveyance zone 6 and the second conveyance zone 7. That is, in the kneading zone 8, inflow from the first conveyance zone 6 is predominant over outflow to the second conveyance zone 7. Because of this, the kneading zone 8 does not become a negative-pressure state. Hereby, in the kneader 1, a degree of kneading in the negative-electrode active material paste to be discharged is uniform, so the discharge thereof is not interrupted. That is, the negative-electrode active material paste having a uniform viscosity can be obtained stably.

Figure 8:
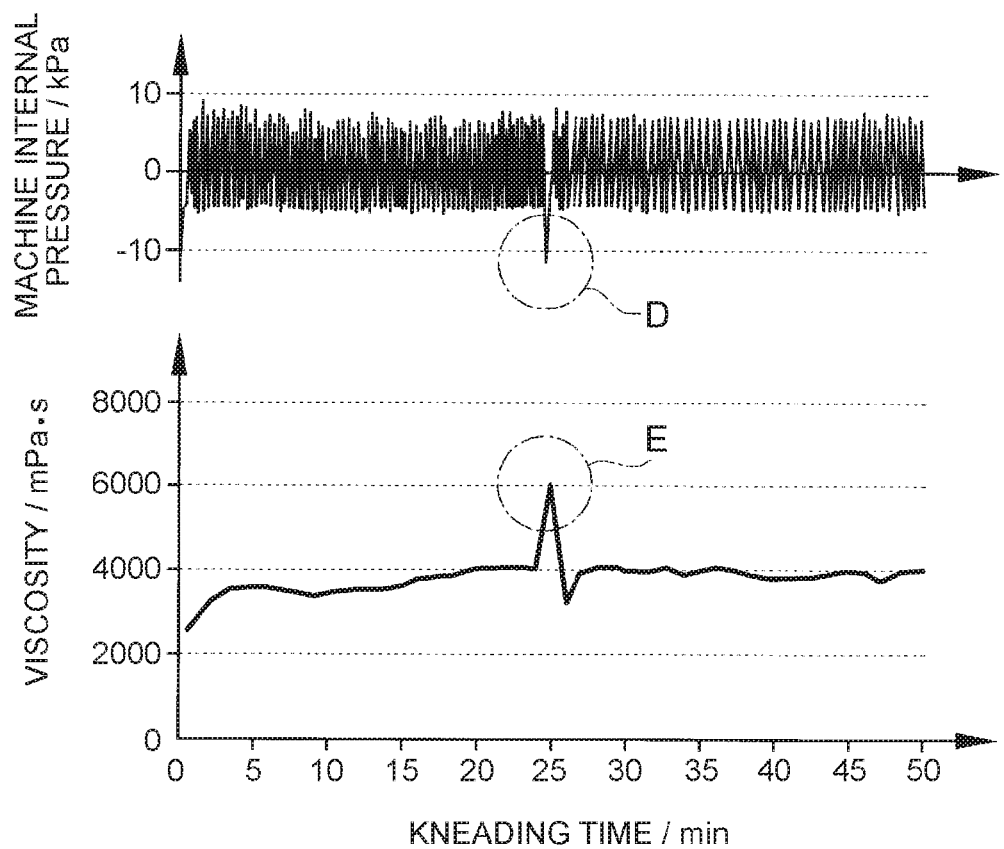
FIG. 8 is graph showing fluctuations of a machine internal pressure of a kneader and a viscosity of a paste to be discharged in a related art (Comparative Example)

If the first conveyance zone 6 and the second conveyance zone 7 have the same conveyance force, the above effect cannot be obtained. That is, in this case, in the kneading zone 8, the outflow to the second conveyance zone 7 is slightly predominant over the inflow from the first conveyance zone 6. This is because the negative-electrode active material paste that has been kneaded is slightly easily conveyed as compared with the kneading material that has not been kneaded. On this account, by execution of the kneading, the kneading material existing in the kneading zone 8 is gradually decreased. Accordingly, a negative pressure occasionally occurs during the execution of the kneading though temporarily, as indicated by "D" in a graph on an upper side in FIG. 8. At this time, a viscosity of the negative-electrode active material paste discharged from the outlet 5 temporarily increases and reaches a peak E, as shown in a graph on a lower side in FIG. 8. Note that a discharge amount of the negative-electrode active material paste temporarily decreases at this time. As such, when the first conveyance zone 6 and the second conveyance zone 7 have the same conveyance force, the kneading of the kneading material is not stable actually.

In contrast, the kneader 1 of the present embodiment is configured such that the conveyance forces of the first conveyance zone 6 and the second conveyance zone 7 made different from each other, thereby preventing such an inconvenience. That is, in the kneader 1 according to the present embodiment, a viscosity and a flow rate of the negative-electrode active material paste to be obtained are relatively stable. That is, a marked fluctuation in viscosity, like the peak E in the graph on the lower side of FIG. 8, does not occur. Such an effect of the kneader 1 of the present embodiment is markedly obtained in a case of a manufacturing condition in which a discharge flow rate of the negative-electrode active material paste is large. This point is described with reference to graphs of FIGS. 9 and 10.

Figure 9:
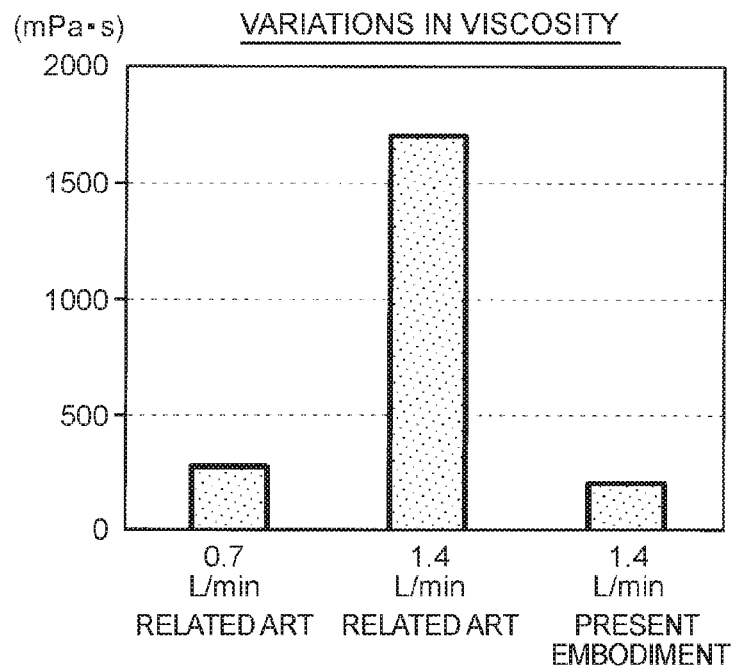
FIG. 9 is a graph showing variations in viscosity of pastes to be discharged.

FIG. 9 is a graph showing variations (standard deviations) in viscosity in negative-electrode active material pastes obtained by kneading. The graph of FIG. 9 shows the variations in viscosity of negative-electrode active material pastes obtained under the following three manufacturing conditions.

A small discharge flow rate (0.7 L/m) without a difference in conveyance force (Related Art) (Left).
A large discharge flow rate (1.4 L/m) without a difference in conveyance force (Related Art) (Center).
A large discharge flow rate (1.4 L/m) with a difference in conveyance force (Present Embodiment) (Right).

In a case of the condition with a small discharge flow rate, even if there is no difference in conveyance force, a viscosity variation is about 300 mPa·s, which is not a very large value. However, when the discharge flow rate is increased without the difference in conveyance force, the viscosity variation is increased to about 1700 mPa·s. In contrast, in a case where there is a difference in conveyance force, like the present embodiment, even if the discharge flow rate is large, it is possible to restrain the viscosity variation to an equivalent level to or less than the viscosity variation at the small discharge flow rate without the difference in conveyance force.

Figure 10:
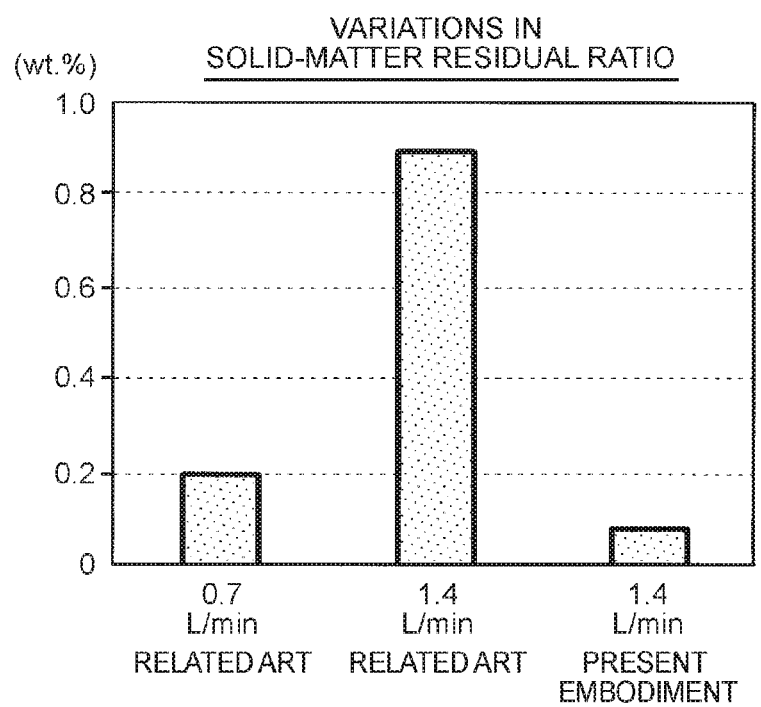
FIG. 10 is a graph showing variations in solid-matter residual ratio in the pastes to be discharged.

FIG. 10 is a graph showing variations (standard deviations) in solid-matter residual ratio in negative-electrode active material pastes obtained by kneading. The solid-matter residual ratio as used herein is a weight ratio of solid components (components other than the kneading solvent in the kneading material) included in a discharged negative-electrode active material paste and remaining as aggregated solid matters without being dispersed in the kneading solvent due to insufficient kneading. The graph of FIG. 10 also shows the variations in solid-matter residual ratio of the negative-electrode active material pastes obtained under the same three conditions as FIG. 9.

In a case of the condition with a small discharge flow rate, even if there is no difference in conveyance force, the variation in solid-matter residual ratio is about 0.2% by weight, which is not a very large value. However, when the discharge flow rate is increased without the difference in conveyance force, the variation in solid-matter residual ratio is increased to about 0.9% by weight. In contrast, in a case where there is a difference in conveyance force like the present embodiment, even if the discharge flow rate is large, it is possible to restrain the variation in solid-matter residual ratio to about 0.1% by weight, which is smaller than a case of the small discharge flow amount without the difference in conveyance force.

As such, in FIGS. 9 and 10, the effect obtained by forming the difference in conveyance force like the present embodiment is exhibited. Note that, although not illustrated in these graphs, even in a case of the condition with a small discharge flow rate, it is possible to restrain the viscosity and the solid-matter residual ratio to be small by forming the difference in conveyance force, like the present embodiment. In view of this, even in the case of the condition with a small discharge flow rate, there is meaning in employing the technique of the present embodiment.

The negative-electrode active material paste obtained as such is applied on a collector, so that a negative-electrode active material layer can be formed on the collector. Hereby, an electrode body for a secondary battery or the like is obtained. The electrode body includes the collector and the negative-electrode active material layer provided of a surface thereof. In general, after the application, a layer of the negative-electrode active material paste is dried to remove the kneading solvent, thereby forming the negative-electrode active material layer. Further, it is common to form the negative-electrode active material layer on both sides of the collector. Here, as described above, since the variations in viscosity and solid-matter residual ratio of the negative-electrode active material paste obtained by the kneader 1 are small, the quality of the negative-electrode active material layer of the electrode body is also stable. Further, it is possible to stably perform a step of application.

EXAMPLES

The following describes Examples. In Examples, in terms of a kneading material, the afore-mentioned material used to manufacture the negative-electrode active material paste was used, and a target viscosity of a negative-electrode active material paste to be obtained was set to 4000 mPa·s. Further, the following two process conditions were employed.

Discharge flow rate: 0.7 L/m (axis rotation speed: 600 rpm)
Discharge flow rate: 1.4 L/m (axis rotation speed: 1200 rpm)

Details of Comparative Examples 1 and 2 and Examples 1 to 4 are shown in Table 1. In Table 1, three items, i.e., "Solid Content", "Discharge Flow Rate," and "Screw Outside Diameter Ratio" are shown as manufacturing conditions for respective examples, and four items, i.e., "Paste Viscosity", "Viscosity Variation," "Residual Solid Content Variation," and "Evaluation" are shown as results. First described are these items.

"Solid Content" indicates a weight ratio of a solid content in a kneading material to be put, that is, a weight ratio of all components except a kneading solvent in the kneading material. "Discharge Flow Rate" indicates a flow rate of a negative-electrode active material paste to be discharged, that is, a throughput speed of kneading. "Screw Outside Diameter Ratio" indicates a ratio obtained by dividing an outside diameter A of a first screw blade 11 by an outside diameter A of a second screw blade 12. In Comparative Examples 1, 2, there is no difference in outside diameter and their screw outside diameter ratios are 1.0, which does not satisfy the feature of the present embodiment. On this account, they are shown in italic type in Table 1. Note that, in terms of a diameter B of a rotor portion 13, the first screw blade 11 and the second screw blade 12 have the same diameter B in all of Comparative Examples and Examples. "Screw Capacity Ratio" indicates a ratio obtained by dividing a conveyance force of the second screw blade 12 by a conveyance force of the first screw blade 11 (a conveyance amount per unit time, an actual value herein). As a value of "Screw Outside Diameter Ratio" is larger, "Screw Capacity Ratio" has a smaller value. In Comparative Examples 1, 2, there is no difference in outside diameter and their screw outside diameter ratios are 1.0, so their screw capacity ratios are shown in italic type in Table 1, similarly to "Screw Outside Diameter Ratio."

"Paste Viscosity" is an average value of a viscosity of a negative-electrode active material paste obtained by kneading. "Viscosity Variation" indicates a variation (standard deviation) in viscosity of the negative-electrode active material paste obtained by kneading. "Residual Solid Content Variation" indicates a variation (standard deviation) in solid-matter residual ratio (described in FIG. 10) in the negative-electrode active material paste obtained by kneading. Evaluation is a good or bad evaluation on quality of the negative-electrode active material paste obtained by kneading, based on "Viscosity Variation" and "Residual Solid Content Variation." ### indicates a paste in which "Viscosity Variation" is 300 mPa·s or less and "Residual Solid Content Variation" is 0.2 wt % or less. ## indicates a paste in which "Viscosity Variation" is 1050 mPa·s or less and "Residual Solid Content Variations" is 0.5 wt % or less, but which does not satisfy the condition of ### . # indicates a paste that does not satisfy the conditions of ### and ## . Values as grounds for # evaluation are shown in italic type in Table 1.

TABLE 1

|  | Condition | | | | Result | | | |
| --- | --- | --- | --- | --- | --- | --- | --- | --- |
|  | Solid Content (wt %) | Discharge Flow Rate (L/min) | Screw Outside Diameter Ratio | Screw Capacity Ratio | Paste Viscosity (mPa·s) | Viscosity σ (mPa·s) | Residual Solid Content σ (wt %) | Evaluation |
| Comparative Example 1 | 54 | 0.7 | 1.0 | 1.0 | 3800 | 287 | 0.2 | ### |
| Comparative Example 2 | 60 | 1.4 | 1.0 | 1.0 | 4200 | 1713 | 0.9 | # |
| Example 1 | 60 | 1.4 | 1.2 | 0.84 | 4100 | 1012 | 0.5 | ## |
| Example 2 | 60 | 1.4 | 1.4 | 0.72 | 3900 | 253 | 0.1 | ### |
| Example 3 | 60 | 1.4 | 1.6 | 0.58 | 3900 | 226 | 0.07 | ### |
| Example 4 | 60 | 1.4 | 2.0 | 0.45 | 3800 | 210 | 0.05 | ### |

The following things are found from Table 1. First, in a case of a condition in which the solid content ratio is low and the discharge flow rate is small, even if there is no difference in conveyance force, any particular problem does not occur (Comparative Example 1). However, if the solid content ratio and the discharge flow rate are increased, a markedly bad result is obtained without the difference in conveyance force (Comparative Example 2). However, in Examples 1 to 4 in which there is a difference in conveyance force, both "Viscosity Variation" and "Residual Solid Content Variation" are improved as compared with Comparative Example 2. Particularly, in Examples 2 to 4 in which "Screw Outside Diameter Ratio" is 1.4 or more ("Screw Capacity Ratio" is 0.72 or less), excellent results with ### evaluation are obtained.

Examples 5 to 7 shown in Table 2 are examples in which an amount of a thickener in a kneading material is increased so that a target viscosity of a negative-electrode active material paste to be obtained is set to 7000 mPa·s. Even in a case of forming such a high-viscosity negative-electrode active material paste, since Examples 5 to 7 have a difference in conveyance force, ### or ## evaluations are obtained. Particularly, in Examples 6, 7 in which "Screw Outside Diameter Ratio" is 1.6 or more ("Screw Capacity Ratio" is 0.58 or less), excellent results with ### evaluation are obtained.

TABLE 2

|  | Condition | | | | Result | | | |
| --- | --- | --- | --- | --- | --- | --- | --- | --- |
|  | Solid Content (wt %) | Discharge Flow Rate (L/min) | Screw Outside Diameter Ratio | Screw Capacity Ratio | Paste Viscosity (mPa·s) | Viscosity σ (mPa·s) | Residual Solid Content σ (wt %) | Evaluation |
| Example 5 | 60 | 1.4 | 1.4 | 0.72 | 6800 | 319 | 0.3 | ## |
| Example 6 | 60 | 1.4 | 1.6 | 0.58 | 7000 | 235 | 0.12 | ### |
| Example 7 | 60 | 1.4 | 2.0 | 0.45 | 6900 | 232 | 0.07 | ### |

Example 8 shown in Table 3 is an example in which a discharge flow rate (throughput speed) is further increased (shaft rotation speed: 1800 rpm). A target viscosity of a negative-electrode active material paste is set to 4000 mPa·s similarly to Examples in Table 1. Even in a case where the negative-electrode active material paste is obtained with a high throughput speed as such, since Example 8 has a difference in conveyance force is 1.6 ("Screw Capacity Ratio" is 0.58), an excellent result with ### evaluation is obtained.

TABLE 3

| | Condition | | | | Result | | | |
|---|---|---|---|---|---|---|---|---|
| | Solid Content (wt %) | Discharge Flow Rate (L/min) | Screw Outside Diameter Ratio | Screw Capacity Ratio | Paste Viscosity (mPa · s) | Viscosity σ (mPa · s) | Residual Solid Content σ (wt %) | Evaluation |
| Example 8 | 60 | 2.1 | 1.6 | 0.58 | 3700 | 265 | 0.1 | ### |

As described above specifically, according to the present embodiment and Examples, in the kneader 1 for manufacturing a negative-electrode active material paste by stirring (kneading) a kneading material while conveying the kneading material by the conveyance screws 3, respective conveyance zones (the first conveyance zone 6 and the second conveyance zone 7) are provided on the upstream side and the downstream side of the kneading zone 8. The first conveyance zone 6 and the second conveyance zone 7 are configured to have a difference in conveyance force in a case where the same conveyance object is conveyed. That is, the first conveyance zone 6 on the upstream side is configured to have a stronger conveyance force than the second conveyance zone 7 on the downstream side. This prevents a temporary occurrence of a negative pressure state in the kneading zone 8 and a temporary increase in viscosity of the negative-electrode active material paste along with the temporary occurrence of the negative pressure state. This accordingly attains the kneader 1 that can stably manufacture the negative-electrode active material paste while restraining the variations in viscosity and residual solid content of the negative-electrode active material paste to be obtained, and the manufacturing method of the electrode body with the use of the kneader 1.

Note that the present embodiment is merely an example, and does not limit the present invention at all. Accordingly, the present invention can be naturally altered and modified without deviating from the gist thereof. For example, a paste to be manufactured is not limited to the negative-electrode active material paste. The present invention is applicable to a case where a positive-electrode active material paste is manufactured by kneading. Further, a target battery type is not limited in particular. Further, the present invention is applicable to manufacture of a paste for purposes other than the battery.

Further, the configuration of the conveyance screw 3 of the kneader 1 is also modifiable. A first conceivable modification about the conveyance screw 3 is a modification in shapes of the first screw blade 11 and the second screw blade 12. The first screw blade 11 and the second screw blade 12 illustrated in FIG. 4 are each configured to include the rotor portion 13 and the thread portion 14. However, the rotor portion 13 is not essential. That is, the thread portion 14 may be formed directly in a rotating shaft. In that case, a diameter of the rotating shaft itself corresponds to the afore-mentioned "diameter B." Further, the thread portion 14 may not be configured to continue in a spiral shape as illustrated herein. A plurality of fan-shaped projections may be provided in an inclined manner with respect to an axial direction.

Further, it is conceivable to modify a shape of a part of the conveyance screw 3 in the kneading zone 8. The above embodiment describes that the stirring member 16 in the kneading zone 8 has only a stirring function, but does not have a conveyance function. However, the stirring member 16 may be configured to also have the conveyance function to some extent. Further, an overall configuration of the kneader 1 is not limited to the configuration including two conveyance screws 3. The kneader 1 may be constituted by one conveyance screw 3, or may be constituted by three (or more) conveyance screws 3.

Further, about the putting of the kneading material into the kneader 1, the above embodiment describes that the kneading material is just put into the inlet 4, which may be a little more complicated. For example, only part of the kneading solvent (water in the present embodiment) is put into the inlet 4, and the remaining part thereof may be additionally put at around a boundary between the kneading zone 8 and the second conveyance zone 7. Further, the binder (SBR in the above embodiment) may not be put into the inlet 4, but may be put additionally at around the second conveyance zone 7.

What is claimed is:

1. A kneader comprising: an extruder housing having an inlet into which a battery material is put and an outlet from which a kneaded mixture obtained by kneading the battery material is discharged; and
  a rotational conveyance member having
    a kneading zone configured to knead the battery material,
    a first conveyance zone placed on an upstream side relative to the kneading zone and configured to convey the battery material, and
    a second conveyance zone placed on a downstream side relative to the kneading zone and configured to convey the battery material,
    the second conveyance zone having a conveyance force smaller than a conveyance force of the first conveyance zone,
  wherein the rotational conveyance member includes a first screw blade in the first conveyance zone;
  the rotational conveyance member includes a second screw blade in the second conveyance zone;
  wherein the kneading zone includes a stirring member having the same shape as a rotor portion of the first screw blade and having no thread portion; and
  a ratio of an outside diameter of the first screw blade to an outside diameter of the second screw blade is 1.4 or more.

2. The kneader according to claim 1, wherein the first screw blade includes a rotor portion and a thread portion, wherein the rotor portion has a triangular prism shape.

3. The kneader according to claim 1, wherein the second screw blade includes a rotor portion and a thread portion, wherein the rotor portion has a triangular prism shape.

4. The kneader according to claim 1, wherein the rotational conveyance member consists of the kneading zone, the first conveyance zone and the second conveyance zone.

5. The kneader according to claim 1, wherein the ratio of an outside diameter of the first screw blade to an outside diameter of the second screw blade is 1.4 or more and 2.0 or less.

6. The kneader according to claim 1, wherein the rotational conveyance member includes two conveyance screws in parallel to each other in the extruder housing.

7. A manufacturing method of an electrode body including an electrode active material, the manufacturing method comprising:
   providing the kneader according to claim 1,
   kneading the kneading material including the electrode active material by the kneader, so as to obtain an electrode active material paste; and
   applying, to a collector, the obtained electrode active material paste, so as to obtain the electrode body in which an electrode active material layer is formed on the collector, wherein:
   the kneading material including the electrode active material is put into the inlet; and
   the electrode active material paste is obtained from the outlet.

8. The manufacturing method according to claim 7, wherein
   a solid content ratio in the kneading material to be put into the inlet of the kneader is 60% by weight or more.

* * * * *